Figure 1:
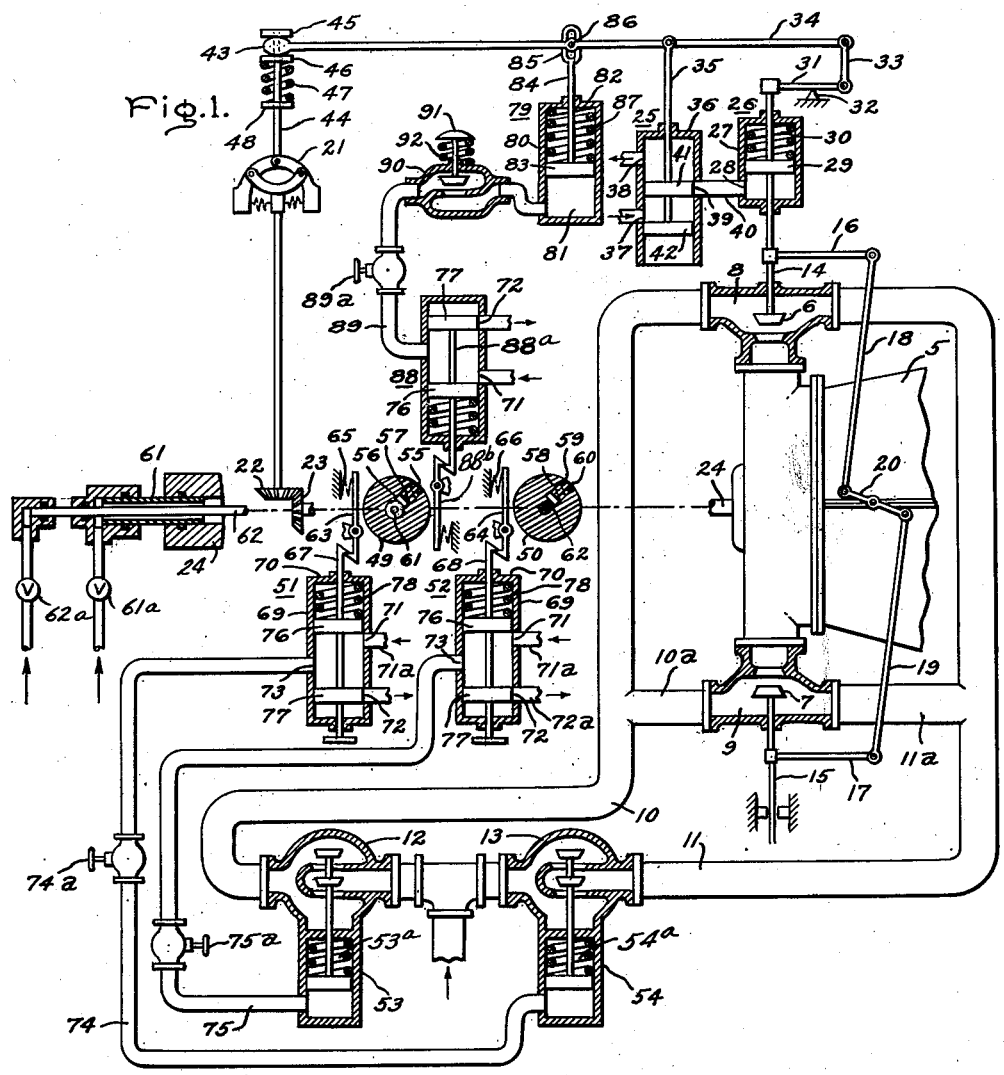

Nov. 11, 1952  J. H. DORAN  2,617,438
APPARATUS FOR TESTING TURBINE STOP VALVES WHILE IN SERVICE
Filed Sept. 11, 1948

Inventor:
John H. Doran,
by Prowell S. Mack
His Attorney.

Patented Nov. 11, 1952

2,617,438

UNITED STATES PATENT OFFICE 2,617,438

APPARATUS FOR TESTING TURBINE STOP VALVES WHILE IN SERVICE

John H. Doran, Scotia, N. Y., assignor to General Electric Company, a corporation of New York Application September 11, 1948, Serial No. 48,907

3 Claims. (Cl. 137—24)

The present invention relates to an arrangement for testing prime mover control valves, more particularly to apparatus for testing the stop valve and the cooperating elements thereof of an elastic fluid turbine.

Elastic fluid turbine generator power plant regulations with respect to emergency equipment associated with the turbine including stop valves, emergency over speed governors etc. are of necessity very rigid. These regulations usually require frequent testing and checking of all such emergency equipment in order to determine whether the equipment would function properly should an actual emergency condition arise. In the case of a stop valve, such testing includes the complete closing of the valve under operating conditions. Heretofore, when testing the stop valves of an elastic fluid turbine operating under load, all of the load would be instantaneously lost by the turbine during the closing of the stop valve. The instantaneous loss of load by any one turbine operating in a power plant system may cause severe disturbances in the system which cannot be compensated immediately and which may cause considerable inconvenience if not damage to both the power station and ultimate consumer served by these stations. For example, if in a power station comprising several steam turbine generator units, all operating under load, it is decided to test the stop valve of a 100,000 kw. unit, that load is suddenly lost when the stop valve shuts. Immediately, the blow-off valve on the boiler supplying steam to the turbine may "blow" causing a substantial loss of steam due to the pressure which is suddenly built up therein. Then since 100,000 kw. of load has suddenly been lost by the station, the load may start "swinging" or transferring from one unit to another in the station, from one station to another in the system, or since there may be tielines connecting several systems, from one system to another. This swinging of load may be extremely serious in that the speed of the unit and hence the frequency of the load output will swing with the load and severe disturbances in the system which cannot require constant frequency synchronous motor power such as paper mills, steel rolling mills, etc. By contrast, the stop valves of an elastic fluid turbine power plant in accordance with the present invention may be tested so that the aforementioned disadvantages heretofore accompanying such tests, are eliminated.

Accordingly, an object of the invention is to provide a new arrangement for testing the stop valves and associated emergency apparatus of an elastic fluid turbine power plant during operation under load in a manner such that the operation will be continuous with no loss of load.

Figure 2:
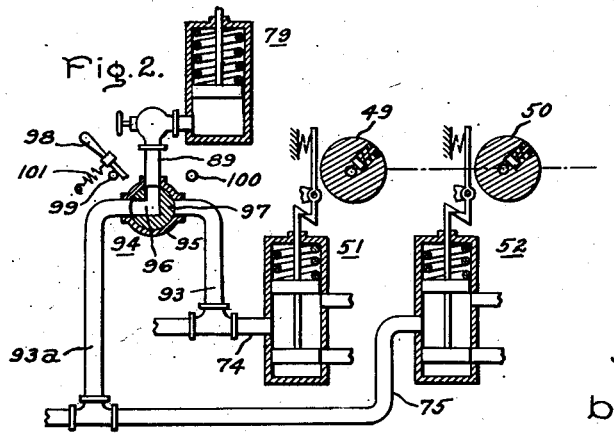

Other objects and advantages will be apparent from the following description taken in connection with the accompanying drawing in which Fig. 1 is a diagrammatic representation of an elastic fluid turbine power plant embodying the present invention; and Fig. 2 indicates diagrammatically an alternate form of the invention.

Referring now to Fig. 1, a turbine 5 having inlet valves 6, 7 positioned in upper and lower fluid distribution chambers 8, 9, respectively, is supplied with elastic fluid such as steam, from a boiler (not shown) through conduits 10, 11 containing emergency stop valves 12, 13. Although I have shown only two stop valves, it will be understood by those skilled in the art that a greater number of valves may be used without departing from the invention. Conduits 10 and 11 are arranged in parallel flow relation by the provision of branch conduits 10a, 11a connecting the former conduits with lower chamber 9. Thus steam may be supplied to chambers 8 and 9 through either or both conduits 10, 11 and the respective branch conduits 10a, 11a.

Inlet valves 6, 7 have stems 14, 15, respectively, which are connected by a linkage system in a way such that any movement of valve 6 is transmitted to valve 7 and a like movement thereof is produced. The linkage system is represented diagrammatically in the present embodiment and includes rigid arms 16, 17 each of which is fixed at one end to stems 14, 15. The opposite ends of arms 16, 17 are connected by links 18 and 19 to opposite ends of link 20 pivotally supported at its center. Thus, it may be observed that if valve 6 moves toward the open position, valve 7 will do likewise, and conversely, a closing movement of valve 6 produces a closing movement of valve 7.

Valves 6 and 7 are actuated by a governing mechanism which includes a speed responsive governor 21 geared through suitable gearing 22, 23 to the shaft 24 of turbine 5, an operating pilot valve 25, and an operating cylinder 26 in the form of a hydraulic motor in which the displacement of operating fluid is controlled by pilot valve 25. Cylinder 26 comprises a housing 27 defining a fluid port 28, and a piston 29 slidably arranged within housing 27 and biased downwardly by a spring 30 against the fluid pressure in the pressure chamber formed beneath piston 29. The stem 14 of valve 6 also serves as the stem of piston 29 and is connected at its upper end to the left-hand end of a follow-up lever 31 which is pivotally supported at an intermediate point by a fulcrum 32. The right-hand end of lever 31 is connected by a link 33 to the right-hand end of an operating lever 34, an intermediate point of which is pivoted to the upper end of spindle 35 of pilot valve 25. Pilot valve 25 includes a casing 36 open at its lower end and defining an inlet port 37, an outlet port 38, and a supply port 39 connected by a conduit 40 to port 28 of operating cylinder 26. The flow of pressure fluid to and from operating cylinder 26 is controlled by a movable valve member having an upper valve head 41, and a lower valve head 42, both connected to spindle 35 and slidably arranged within casing 36.

The left-hand end of lever 34 forms a forked yoke 43 through which passes the governing rod 44 of speed governor 21. At its upper end, rod 44 is provided with a head member 45 which during normal operation engages the upper surface of yoke 43. Rod 44 also has a freely slidable collar 46 biased upwardly by a spring 47 seated against a fixed member 48 so as to engage the lower surface of yoke 43.

Under normal operating conditions an increase in turbine speed causes outward movement of the flyweights of speed governor 21 whereby rod 44 and yoke 43 of operating lever 34 move downwardly causing downward movement of stem 35 and valve heads 41, 42 of pilot valve 25. The downward movement of head 41 uncovers port 39 from the top to permit the discharge through port 38 of a portion of the pressure fluid beneath piston 29 of operating cylinder 26 so that piston 29 moves downwardly. Downward movement of piston 29 causes turbine inlet valves 6, 7 to move towards the closed position thereby decreasing the supply of elastic fluid to turbine 5 and effecting a resultant decrease in turbine speed. Simultaneously, the downward movement of piston 29 causes counterclockwise turning movement of follow-up lever 31 about fulcrum 32 thus raising the right-hand end of lever 34 which in turn raises pilot valve stem 35 so as to restore head 41 to its original in-line position relative to port 39.

Similarly, a decrease in turbine speed causes inward movement of the governor flyweights resulting in an upward movement of rod 44, the left-hand end of lever 34, pilot valve stem 35 and valve heads 41, 42. Upward movement of head 41 uncovers port 39 from the bottom thereby communicating pressure fluid inlet port 37 with the pressure chamber of operating cylinder 26. Thus, piston 29 is moved upwardly causing an opening movement of inlet valves 6, 7 and a resultant increase in turbine speed. The upward movement of piston 29 causes a simultaneous clockwise turning movement of follow-up lever 31 about fulcrum 32 which lowers the right-hand end of lever 34. The downward movement of the right-hand end of lever 34 in turn causes stem 35 to be moved downwardly so that head 41 is restored to its normal in-line position relative to port 39 thereby shutting off the supply of pressure fluid to piston 29.

In connection with elastic fluid turbines employed as prime movers it is customary to provide an emergency overspeed device usually in the form of a centrifugally actuated governor connected to the turbine shaft which at a predetermined speed will "trip out" causing the stop-valve to be actuated so as to be immediately closed and thereby shut off the supply of elastic fluid to the turbine. The turbine 5 of the present example is provided with two such emergency overspeed governors 49 and 50 each of which is separately adapted to actuate emergency trip valves 51, 52 which in turn control the supply of operating liquid to the hydraulic motors 53 and 54 of stop-valves 12 and 13.

Emergency governors 49 and 50 may be any one of several known types. A suitable form is of the type illustrated having a trip rod 55 with a piston 56 at the radially inward end thereof which is slidably arranged within a chamber 57 and retained therein under normal operating speeds by a spring 58. Spring 58 is seated at one end against a threaded plug 59 and at the opposite end against head 56. Plug 59 has a central opening 60 through which rod 55 passes in freely slidable relation therewith. During normal speed operation of turbine 5, the retaining force exerted on rod 55 by spring 58 is sufficient to overcome centrifugal force, but at a predetermined overspeed such as 110% normal rated speed, the centrifugal force exerted outwardly on rod 55 is sufficient to overcome the aforementioned spring force and rod 55 moves outwardly or "trips."

For testing purposes, either governor 49 or 50 may be tripped, at will, as for instance by actuating valves 61a or 62a to supply liquid under pressure, by way of coaxial bores 61, 62 in shaft 24, to the respective pistons 56.

Positioned adjacent emergency governors 49, 50 and adapted to be actuated thereby, are latches 63, 64 which are pivotally supported about intermediate points and biased by springs 65, 66 so as to engage and retain the valve stems 67, 68 of emergency trip valves 51 and 52, respectively. It will be apparent that the stop valves may also be tripped, regardless of turbine speed, by manually rotating the latches 63, 64.

Trip valves 51, 52 are of the well known "three way" type and include casings 69 defining central axial chambers closed by head members 70 through which stems 67, 68 pass in freely slidable relation therewith. Casings 69 further define fluid inlet ports 71 communicated with a pressure fluid supply (not shown) by conduits 71a, fluid outlet ports 72 communicated with a suitable reservoir (not shown) by conduits 72a and operating ports 73, the latter of which communicate with hydraulic motors 53, 54 of stop valves 12, 13 by means of conduits 74, 75. The flow of pressure fluid to and from valves 51, 52 is controlled by movable valve members, each having an upper head 76, and a lower head 77, and each being biased downwardly by a coil spring 78 which is seated against head member 70 at one end and against valve head 76 at the other end.

A further safety feature is provided in the form of an emergency cylinder 79 having a casing 80 defining a fluid chamber 81 which is closed at its upper end by a cylinder head 82. Chamber 81 contains a movable plunger 83 connected to a stem 84 which passes through a central opening formed in cylinder head 82. At its upper end stem 84 is provided with a head 85 forming an elongated slot which cooperates with a pin 86 provided in operating lever 34 to form a lost motion connection therewith. Plunger 83 is biased downwardly by a coil spring 87 against pressure fluid in chamber 81 which is supplied from an external source (not shown) through a third emergency trip valve 88, conduit 89, valve 89a and a normally open manually controlled "holding valve" 90 having an operating handle 91 biased to the open position by a spring 92.

Trip valve 88 is similar in all respects to trip valves 51, 52 (like members representing like parts) and like the latter is normally maintained in an extreme position as shown in Fig. 1 by means of a spring biased pivoted latch 88b which in turn is adapted to be actuated by an emergency governor such as 49.

During normal operation, stop valves 12, 13 are maintained in the open position by means of pressure fluid which is supplied to trip valves 51, 52 through inlet ports 71 thence through ports 73 and conduits 74, 75 to hydraulic motors 53, 54. If an emergency turbine overspeed condition occurs necessitating the immediate shutdown of the turbine, centrifugal force will cause rod 55 of emergency governors 49, 50 to move outwardly and trip latches 63, 64 thereby releasing stems 67, 68 of trip valves 51, 52. Once released, stems 67, 68 under the influence of biasing springs 78 move downwardly until upper head members 76 cover inlet ports 71 and lower head members 77 uncover outlet ports 72. Stop valves 12, 13 may now close, biased by springs 53a, 54a, since the operating fluid supplied to hydraulic motors 53, 54 and maintaining valves 12, 13 in the open position, exhausts through ports 72 and conduits 72a to a reservoir (not shown).

Simultaneously, latch 88b is tripped by emergency governor 49, thereby, releasing stem 88a of trip valve 88 to the end that operating fluid from beneath piston 83 in chamber 81 of emergency cylinder 79 is discharged through outlet port 72 (valve 88). Heavy spring 87 then causes downward movement of piston 83 and stem 84 whereupon the upper end of the slot in head 85 engages pin 86 causing counterclockwise movement of operating lever 34 about link 33, compressing lighter spring 47 and lowering stem 35 and valve heads 41, 42 of pilot valve 25. The downward movement of head 41 uncovers port 39 from the top to permit the discharge through port 38 of the pressure fluid beneath piston 29 of operating cylinder 26 so that the spring 30 moves piston 29 downwardly closing turbine inlet valves 6, 7 as described hereinbefore.

Thus, it may be observed that a two way safety feature is provided in that both the stop valves and turbine inlet valves close immediately upon the occurrence of a turbine emergency overspeed condition.

Assuming now that turbine 5 is operating under load and it is desired to test stop valves 12, 13 in accordance with power plant regulations, each stop valve may be tested independently of the other with substantially no loss of load on turbine 5, by first tripping either emergency governor, as for instance by manually rotating latch 64 counterclockwise, or by opening valve 62a. The tripping of governor 50 causes valve 52 to trip and release fluid from hydraulic motor 53 of stop valve 12 whereupon the latter closes shutting off the supply of steam to turbine 5 through branch conduit 10. Meanwhile, however, the operation of turbine 5 continues uninterrupted since stop valve 13 remains in the open position thus permitting a continuous supply of steam through conduits 11 and 11a to operate turbine 5 at a slightly lower efficiency due to the increased pressure drop of the steam passing through the single stop-valve 13. Valve 75a in conduit 75 may then be closed, stem 68 of trip valve 52 relatched to uncover inlet port 71, and valve 75a reopened to open stop-valve 12. Substantially, the same procedure may then be followed in connection with emergency governor 49 to test stop-valve 13, however, here it must be borne in mind that since emergency cylinder 79 controlling the turbine inlet valve governing mechanism is also adapted to be actuated by emergency governor 49 to close inlet valves 6, 7 as described above, the "holding valve" 90 in conduit 89 must be closed before emergency governor 49 is tripped so that there is no loss of pressure fluid maintaining emergency cylinder 79 in the operating position shown in Fig. 1. It will be apparent that when emergency governor 49 is manually tripped to close stop-valve 13 thus cutting off the steam supply through conduit 11, stop valve 12 remains in the open position thereby permitting a continuous supply of operating steam to turbine 5 through conduits 10 and 10a.

In Fig. 2 there is shown a modification of the apparatus of Fig. 1 wherein the third trip valve 88, controlling emergency cylinder 79 and holding valve 90 in conduit 89 are omitted. Here instead, emergency cylinder 79 may be communicated to an operating fluid controlled by either trip valve 51 or 52. Each conduit 74 and 75 (communicating hydraulic motors 53, 54 with associated trip valves 51, 52) has a respective branch conduit 93 and 93a, either of which may be selectively communicated with conduit 89 by means of a three-way valve 94. Valve 94 may be any one of several known types and in the present embodiment includes a housing 95 defining three ports having connected thereto conduits 89, 93 and 93a. Communication is established between conduit 89 and either conduit 93 or 93a by a cutout portion or groove 96 formed in an internal rotatable valve member 97 adapted to be actuated by an operating handle 98 between two stops 99, 100. As shown in Fig. 2, when handle 98 is positioned at stop 99, passage 96 establishes communication between conduits 89 and 93a while clockwise movement of handle 98 to stop 100 causes passage 96 to establish communication between conduits 89 and 93. During normal operation, handle 98 is biased to stop 99 by a spring 101, thus insuring constant communication between emergency cylinder 79 and trip valve 52.

With the modified apparatus shown in Fig. 2, the procedure for testing stop valves 12 and 13 is substantially the same as that followed in connection with the apparatus of Fig. 1. When valve handle 98 is positioned at stop 99 as shown in Fig. 2, stop valve 13 may be tested to close by tripping emergency governor 49 thereby actuating trip valve 51 to release operating fluid from hydraulic motor 54. Meanwhile, the turbine inlet valve governing mechanism and consequently inlet valves 6, 7 remain unaffected since emergency cylinder 79 is then controlled by trip valve 52, which is in turn controlled by emergency governor 50. Even though stop-valve 13 is closed, stop-valve 12 remains open so that steam is continuously supplied to operate turbine 5 through conduits 10 and 10a. Then after relatching stem 67 of trip valve 51 and reopening stop-valve 13 as described hereinbefore in connection with Fig. 1, valve handle 98 may be moved to stop 100 and stop-valve 12 tested to close by tripping emergency governor 50 to actuate trip valve 52 thereby releasing operating fluid from hydraulic motor 53. Here again the turbine inlet valve governing mechanism remains undisturbed since emergency cylinder 79 is now controlled by trip valve 51, as controlled by emergency governor 49. With stop-valve 12 thus closed, operating steam is supplied to turbine 5 through open stop-valve 13 and conduits 11 and 11a.

Thus it will be observed that the present invention makes it possible to test the stop valves of a power plant in a manner such that operation of the turbine is continuous with substantially no loss of load.

While particular embodiments of the invention have been illustrated and described, it will be obvious to those familiar with the art that various changes and modifications may be made without departing from the invention; and it is intended to cover in the appended claims all such changes and modifications as come within the true spirit and scope of the invention.

What I claim as new and desire to secure by Letters Patent of the United States is:

1. A powerplant comprising an elastic fluid turbine with at least one governing valve controlling the admission of motive fluid thereto and speed responsive servo means for positioning said valve, first and second conduits for supplying motive fluid in parallel to the governing valve, a normally open stop valve in each of said conduits, first and second emergency overspeed governors connected to effect closing of said respective stop valves at a preselected speed, and means for separately effecting closing of either stop valve at a lower speed, whereby either stop valve may be closed for testing without interrupting the supply of motive fluid through the other conduit.

2. A powerplant comprising an elastic fluid turbine with at least one governing valve for controlling the admission of motive fluid thereto and speed responsive servo mechanism for positioning said valve, first and second conduits for supplying motive fluid in parallel to the governing valve, a normally open stop valve in each of said conduits, first and second emergency overspeed governors connected to effect closing of the respective stop valves at a preselected speed, means for separately effecting closing of either stop valve at a lower speed, emergency servo mechanism connected to one of the overspeed governors and arranged to cause the governing mechanism to close the governing valve upon occurrence of an emergency overspeed condition, and means for rendering said emergency servo mechanism ineffective, whereby either stop valve may be closed for testing independently of the other without closing the inlet valve and without interrupting the flow of motive fluid thereto through the other conduit.

3. A powerplant comprising an elastic fluid turbine having at least one governing valve for controlling the admission of motive fluid thereto and speed responsive servo mechanism for positioning said valve, first and second conduits in parallel for supplying motive fluid to the governing valve, a normally open stop valve in each of said parallel conduits, emergency overspeed governor means connected to effect closing of said stop valves at a preselected speed, means for separately effecting closing of either stop valve at a lower speed, emergency servo mechanism connected to the overspeed governor means and arranged to cause the governing mechanism to close the inlet valve upon occurrence of an emergency overspeed condition, and means for rendering said emergency servo mechanism ineffective whereby either stop valve may be closed for testing while the other stop valve and the governing valve remain open for continuous supply of motive fluid to the turbine through the other conduit.

JOHN H. DORAN.

REFERENCES CITED

The following references are of record in the file of this patent:

UNITED STATES PATENTS

| Number | Name | Date |
|---|---|---|
| 1,494,959 | Kramer | May 20, 1924 |
| 2,158,108 | Deglon | May 16, 1939 |